(12) United States Patent
Sopko, III et al.

(10) Patent No.: US 7,249,030 B2
(45) Date of Patent: Jul. 24, 2007

(54) METHOD AND SYSTEM FOR PROVIDING MAINTENANCE AND MANAGEMENT SERVICES FOR LONG-TERM CAPITAL EQUIPMENT OR FIXTURES BY PROVIDING A PERFORMANCE WARRANTY

(76) Inventors: Victor Sopko, III, 102 Kenwick, Northfield Center, OH (US) 44067; James McMeal Buckley, 2 Valley View La., Moriarty, NM (US) 87035

( * ) Notice: Subject to any disclaimer, the term of this patent is extended or adjusted under 35 U.S.C. 154(b) by 677 days.

(21) Appl. No.: 09/935,843

(22) Filed: Aug. 24, 2001

(65) Prior Publication Data

US 2003/0040924 A1    Feb. 27, 2003

(51) Int. Cl.
     *G06Q 99/00*    (2006.01)
(52) U.S. Cl. .................... 705/1; 705/4; 705/28
(58) Field of Classification Search ............ 705/1, 705/4, 8, 28
     See application file for complete search history.

(56) References Cited

U.S. PATENT DOCUMENTS

| | | | |
|---|---|---|---|
| 4,381,549 A | 4/1983 | Stamp et al. |
| 4,598,273 A | 7/1986 | Bryan et al. |
| 4,755,957 A | 7/1988 | White et al. |
| 4,897,798 A | 1/1990 | Cler |
| 5,073,862 A | 12/1991 | Carlson |
| 5,091,715 A | 2/1992 | Murphy |
| 5,249,120 A | 9/1993 | Foley |
| 5,343,387 A | 8/1994 | Honma et al. |
| 5,481,481 A | 1/1996 | Frey et al. |
| 5,531,122 A | 7/1996 | Chatham et al. |
| 5,608,658 A | 3/1997 | Yao et al. |
| 5,619,193 A | 4/1997 | Doherty et al. |
| 5,729,474 A | 3/1998 | Hildebrand et al. |
| 5,754,451 A | 5/1998 | Williams |

(Continued)

OTHER PUBLICATIONS

"National Clearinghouse for Educational Facilities: Roof Maintenance and Repair", www.edfacilities.org/rl/roof_maintenance/index.htm, Jun. 27, 2003, 9 pages.

(Continued)

*Primary Examiner*—John G. Weiss
*Assistant Examiner*—Michael Fisher
(74) *Attorney, Agent, or Firm*—Reed Smith LLP; Stanley P. Fisher, Esq.; Juan Carlos A. Marquez, Esq.

(57) ABSTRACT

A computer-implemented method for providing maintenance service for long-term capital equipment or fixtures includes the steps of diagnosing existing conditions of the long-term capital equipment or fixtures, providing a warranty on the long-term capital equipment or fixtures in conjunction with a purchase of an initial maintenance service, repairing the long-term capital equipment or fixtures to reach the start-up standard if any of the existing conditions are below the predetermined start-up standard, developing a maintenance schedule according to the predetermined start-up standard and any of existing conditions which are beyond the predetermined start-up standard, and maintaining the long-term capital equipment or fixtures according to the maintenance schedule so as to fulfill the warranty. The providing of the warranty includes transferring from owner to a provider the risk of maintaining performance of the long-term capital equipment or fixtures during a specified time and within a predetermined start-up standard.

10 Claims, 9 Drawing Sheets

THE LIFE CYCLE APPROACH

U.S. PATENT DOCUMENTS

| | | | |
|---|---|---|---|
| 5,761,432 A | 6/1998 | Bergholm et al. | |
| 5,812,962 A | 9/1998 | Kovac | |
| 5,839,096 A | 11/1998 | Lyons et al. | |
| 5,841,112 A | 11/1998 | Brooks et al. | |
| 5,875,430 A | 2/1999 | Koether | |
| 5,931,878 A | 8/1999 | Chapin, Jr. | |
| 5,956,664 A | 9/1999 | Bryan | |
| 6,006,171 A * | 12/1999 | Vines et al. | 702/184 |
| 6,049,742 A | 4/2000 | Milne et al. | |
| 6,067,486 A | 5/2000 | Aragones et al. | |
| 6,122,678 A | 9/2000 | Eckel et al. | |
| 6,125,312 A * | 9/2000 | Nguyen et al. | 701/35 |
| 6,172,602 B1 | 1/2001 | Hasfjord | |
| 6,182,048 B1 | 1/2001 | Osborn et al. | |
| 6,219,590 B1 | 4/2001 | Bernaden, III et al. | |
| 6,578,001 B1 | 6/2003 | Schramek | |
| 6,580,982 B2 * | 6/2003 | Sinex | 701/29 |
| 6,687,634 B2 * | 2/2004 | Borg | 702/85 |
| 6,810,359 B2 * | 10/2004 | Sakaguchi | 702/182 |
| 2001/0051883 A1 | 12/2001 | Loveland | |
| 2002/0035495 A1 | 3/2002 | Spira et al. | |
| 2002/0120535 A1 | 8/2002 | Yu | |
| 2002/0138289 A1 | 9/2002 | Thielges et al. | |
| 2002/0143421 A1 | 10/2002 | Wetzer | |
| 2002/0143564 A1 | 10/2002 | Webb et al. | |
| 2002/0161600 A1 | 10/2002 | Stubiger et al. | |
| 2002/0161608 A1 | 10/2002 | Loveland | |
| 2002/0184135 A1 | 12/2002 | Zakaria | |
| 2003/0004741 A1 | 1/2003 | Johnson et al. | |
| 2003/0014342 A1 | 1/2003 | Vande Pol | |
| 2003/0040934 A1 | 2/2003 | Skidmore et al. | |
| 2003/0061004 A1 | 3/2003 | Discenzo | |
| 2003/0101062 A1 | 5/2003 | Taber, Jr. | |

OTHER PUBLICATIONS

"Technical Information Center: Literature on products and services for powerplant design, operation, and maintenance", POWER, vol. 145, No. 6, ISSN: 0032-5929, 19 pages.

"A Company 100 Years in the Making (Simon Roofing)", Indianapolis Business Journal, May 28, 2001, vol. 22, No. 11, ISSN: 0274-4929, 12 pages.

Maselli, M. Grace, "Artful Experts in Mechanical Rejuvenation Tell How and Why They Serve This Critical Niche", Printing News, Jun. 25, 2001, vol. 146, No. 26, 6 pages.

* cited by examiner

| TRIM 2000 | | | | |
|---|---|---|---|---|
| TASK OPTIONS | | TASK TYPE | | |
| ○ ALL | | ALL ▽ | | |
| ● OPEN TASKS | | ALL | | |
| ○ SCHEDULED TASKS | | MAINTENANCE | | |
| ○ COMPLETED TASKS | | REPAIRS | | |
| ○ CANCELED TASKS | | REPLACE | | |
| | | RESTORE | | |
| | | SERVICES | | |
| | | MISC | | |

TASK OPTIONS

| BUILDING | ROOF | TYPE | TASK | SCHD |
|---|---|---|---|---|
| BUILDING 3 | ROOF 3 | MAINTENANCE | GOOD, MAINTAIN ROOF | / / |
| BUILDING 3 | ROOF 3 | MAINTENANCE | GOOD, MAINTAIN ROOF | / / |
| BUILDING 3 | ROOF 3 | MAINTENANCE | GOOD, MAINTAIN ROOF | / / |
| BUILDING 3 | ROOF 3 | REPAIRS | REPAIRS REQUIRED, MINOR | / / |
| BUILDING 3 | ROOF 3 | REPAIRS | REPAIRS REQUIRED, MINOR | / / |
| BUILDING 3 | ROOF 3 | REPAIRS | REPAIRS REQUIRED, MINOR | / / |
| BUILDING 3 | ROOF 3 | REPAIRS | REPAIRS REQUIRED, MAJOR | / / |
| BUILDING 3 | ROOF 3 | RESTORE | RESTORE IMMEDIATE | / / |

| TRIM 2000 | | | | |
|---|---|---|---|---|
| | NO | PRIORITY | TYPE | SCOPE |
| ☐ | 1 | 1 IMMEDIATE | REPAIRS | REPAIR AT PERIM |
| ☐ | 2 | 1 IMMEDIATE | REPAIRS | REPAIR AT LAPS |
| ☐ | 3 | 1 IMMEDIATE | REPAIRS | FILL PITCH POCK |
| ☐ | 4 | 1 IMMEDIATE | REPAIRS | RE-SECURE COU |
| ☐ | 5 | 1 IMMEDIATE | REPAIRS | REMOVE SEALAN |
| ☐ | 6 | 1 IMMEDIATE | REPAIRS | RESEAL LAPS |
| ☐ | 7 | 1 IMMEDIATE | REPAIRS | RESEAL COPING |
| ☐ | 8 | 1 IMMEDIATE | REPAIRS | COAT FLASHINGS |
| ☐ | 9 | 1 IMMEDIATE | REPAIRS | CLEAN DEBRIS |
| ☐ | 10 | 1 IMMEDIATE | REPAIRS | REPAIR BLISTERS |
| ☐ | 11 | 1 IMMEDIATE | REPAIRS | SPUD GRAVEL |
| ☐ | 12 | 1 IMMEDIATE | REPAIRS | STRIP IN SINGLE |

CUSTOMIZED TEXT

REPAIR MEMBRANE VOIDS AND FRACTURES AT THE PERIMETER

ADD TEXT

ORDER
◉ NUMBER
○ PRIORITY

OK   CANCEL

METHOD AND SYSTEM FOR PROVIDING MAINTENANCE AND MANAGEMENT SERVICES FOR LONG-TERM CAPITAL EQUIPMENT OR FIXTURES BY PROVIDING A PERFORMANCE WARRANTY

BACKGROUND OF THE INVENTION

1. Field of the Invention

The invention generally relates to a method for providing maintenance service for long-term capital equipment or fixtures by providing a warranty on the long-term capital equipment or fixtures in conjunction with a purchase of initial maintenance service while the warranty transfers from an owner to a provider the risk of maintaining performance of the long-term capital equipment or fixtures within a reasonable range from a predetermined start-up standard. In particular, the long-term capital equipment or fixtures are first repaired to reach the start-up standard and then maintained according to a maintenance schedule. For purposes of this invention, the term "owner" includes any person, party or entity that has ownership rights, a security interest, trusteeship responsibility or other legal control over the capital equipment or fixture in question, while the term "provider" shall refer to the person, party or entity responsible for the operation of the maintenance service and warranty.

2. Description of Related Arts

Long-term capital equipment or fixtures require good design, quality materials and proper installation to perform successfully. Once long-term capital equipment or fixtures have been installed, nothing is more critical to its long-term performance than proper maintenance. For example, roof leaks not only can be difficult to detect but providing proper repair will insure lasting performance. Rather than relying upon common sense to dictate maintenance and repairs, there is a need for a systematic approach. This is evident in view of the fact that each roof exhibits different qualities and the longevity and cost of replacement depends on the quality of the roof at the outset and the quality of labor and materials involved. Roof renovation and preventive maintenance can extend roof life up to 100%. The cost of renovating a roof is about ten to thirty percent of the cost of a new roof. If action is taken in time, there is no need to re-roof. The development of new technology and techniques in leak prevention and maintenance have resulted in an efficient and effective innovation in roof maintenance.

Roofing is not that same old kettle of hot asphalt that the construction industry has seen applied with more or less the same techniques for over a hundred years. It has become an ever-changing focus on technology and the waterproofing relationship to the building envelope. With over twenty generic types of roof systems and scores of manufacturers producing countless numbers of products, the combinations of roofing systems can be overwhelming. It is somewhere within those aforementioned boundaries that the fundamentals of roofing facts and fiction get a little blurry. Roofing, as any other industry, will evolve in cycles based upon its current technology and profitability of application.

A video or infrared analysis of a roof will identify most of the potential problem areas. After restoration of the roof, a routine maintenance program will ensure the performance of the roof. There are many companies providing roof maintenance programs. Benefits of a roof maintenance program include the ability to detect visible problems in the early stages, to avoid costly repairs caused by water damage, to record the maintenance history, and to prevent leaks before they occur, allow planning and budgeting for the maintenance service.

Under the MAGCO's Roof Maintenance Program, each roof is first evaluated to determine it's serviceability, based on age, condition and quality; then it will be placed in different categories of maintenance services. The staff of the MAGCO's Roof Maintenance Program (http://www.magco-.com/roofmaint.html) recommends initial corrective repairs to be completed prior to a yearly service contract being offered. The costs vary depending on category and building size. However, the information is not organized electronically.

Roof Consultant's, Inc.'s Roof Maintenance Program (http://www.roofconsultants.com/ROOFMAINTENANCE-.html) is implemented at the beginning of the roof's life for a new roof or an existing roof after rehabilitation to bring the roof up to a maintainable condition. Once the existing conditions are corrected, Roof Consultant's, Inc. begins its five year Roof Maintenance Program and continue to maintain the roof system throughout it's duration. During the term of the maintenance agreement, Roof Consultant's, Inc. visits the facility a minimum of two times annually. Upon each visit, Roof Consultant's, Inc. makes arrangements for corrective and preventive repairs to keep the roof in a serviceable condition. If the roof is properly functioning at the end of the agreement, Roof Consultant's, Inc. offers the option of extending an otherwise conventional maintenance agreement.

Anthony Roofing Ltd. (ARL) provides five discreet maintenance programs, modest to aggressive, (http://www.anthonyroofing.com/maintain.htm) to suit different needs and budgets. ARL works with a client to develop a plan to maintain and protect a specific roofing asset with separate pieces of tools such as Roof Condition Analysis, Multi-year Computerized Budget Planning, CAD Drawing and Documentation, Emergency Repair Service, Regular Preventive Maintenance, and Leak-Free Warranty Repairs. In particular, its only fully-computerized system, the Multi-Year Computerized Budget Planning System, is separated from, rather than integrated with, its semi-computerized system, the CAD Drawings And Documentation System. The Multi-Year Computerized Budget Planning System applies computer software to provide multi-year budget planning information for one building, or for multiple facilities. The budget information is prioritized based upon the condition of each roof. A permanent database is maintained to track real costs over the long-term, so that the Multi-Year Computerized Budget Planning System can identify problem areas, and also see the cost benefits of maintaining your roofing asset. Anthony's CAD Drawings And Documentation System is manually operated by staff in the CAD department to provide drawings as part of their initial Roof Condition Analysis, or to document conditions during the term of a maintenance agreement. There is a need to computerize and integrate all the systems.

Building owners' purchasing decisions of maintenance services typically are influenced by warranties provided. Such conventional warranties provided by roofing materials manufacturers or roofing contractors are not intended to transfer any substantive level of risk from the building owner to the warranty provider. A building owner cannot neglect or ignore the need for roof system maintenance after a new roof system that features a long-term warranty is installed. Most roof system warranties for a existing roof are reactive, rather than proactive, solutions to roofing problems. For example, most warranties provide for only limited repairs once a roofing problem (e.g., leakage) is detected if the problem is included within the warranty's limited coverage, as they are only responsible for meeting the service requirements as defined by the agreed scope of work. Also, most roof system warranties contain specific provisions that require building owners to properly maintain roof systems during the warranties' terms. In many cases, for legitimate reasons, the building owners are unable or unwilling to perform their own maintenance in conjunction with a traditional warranty. A traditional warranty falls short of meeting the need for roof system maintenance. Therefore, in order to achieve an effective roof system maintenance program, a vehicle for transferring roof performance risk from the build-owner to another party is needed.

Generally, a private/commercial build-owner may purchase a service or maintenance program for as long a time period as the industry offers; current industry standards limit such programs to five years. However, current U.S. public financing laws generally limits the purchase of service agreements by a public agency to one-year increments. Consequently, a vehicle for providing maintenance service beyond one-year increments to the public sector is also needed.

There are many systems for diagnosing problems associated with long-term fixtures or equipment. For example, U.S. Pat. No. 4,598,273 shows a leak detection system for roofs. In combination with the detecting units, position and direction locator apparatus are used to localize the source of the leak and the extent of any water damage caused thereby (Abstract). Some inventions further include a failure-anticipating feature. U.S. Pat. No. 5,729,474 shows a failure-anticipating system for air-conditioning equipment.

U.S. Pat. No. 5,343,387 shows a cyclical maintenance worker and work schedule table preparation system. The system focuses on matching labor with scheduled maintenance work. The system describes a worker data memory for storing the names, work details, last working dates, but it fails to explain how the frequencies of the maintenance work of buildings are decided. Further, it does not mention a predetermined start-up standard or repairing the fixtures or equipment to reach a predetermined start-up standard.

U.S. Pat. No. 6,067,486 shows an aircraft maintenance system which simply accepts the remaining life of a part rather than implementing repairs to the part to reach a predetermined start-up standard as in the present invention. U.S. Pat. No. 4,755,957 shows an air-conditioning servicing system which does teach diagnosing problems of air-conditioning equipment and repairing the equipment to reach a predetermined standard. However, such a standard is not a start-up standard of a maintenance schedule or a maintenance contract.

A professional roofing contractor will offer periodic maintenance inspections throughout the year, which help ensure a project complies with the standards specified in the warranty. To effectively manage roof assets, one must first determine what are the existing conditions. The integrity of a roofing system is reliant on more than the roofing membrane alone. There are other components which directly affect the overall performance of the system. These components include; the substrate (or deck), insulation, penetrations, flashings (Parapet wall, Curb, Gutter, Roof to wall termination etc.), and roof top equipment just to name a few. A maintenance program usually consists of a detailed visual examination of the roof system, flashing and insulation to identify potential problem areas. Establishing a regular roof system maintenance program is as important as selecting a professional roofing contractor and the proper roof system for a building. The most effective way to keep a roof system performing over time is for the owner or maintenance manager to develop a long-term relationship with a professional roofing contractor. A professional roofing contractor knows the local building codes and practices, understands the components of different roof systems and can make recommendations about materials and roof systems for a specific building. A professional contractor also can respond quickly with trained, experienced workers if a problem arises. Maintenance programs offer many advantages. By establishing a maintenance program, a maintenance executive is taking a proactive approach rather than a reactive one—identifying a problem during its early stages and scheduling regular maintenance checks also can reveal potential areas for leaks before they happen. A maintenance program ensures a planned approach to managing a roof system and allows preparation for long-term capital expenditures. Developing a relationship with a professional roofing contractor allows the response time to be greatly improved.

SUMMARY OF THE INVENTION

It is a purpose of this invention to maximize the life cycle of long-term capital equipment or fixtures.

It is another purpose of this invention to computerize and integrate all the relevant systems for providing maintenance service for long-term capital equipment or fixtures.

It is another purpose of this invention to provide a vehicle for transferring the performance risk of long-term capital equipment or fixtures from the build-owner to another party.

It is still another purpose of this invention to provide a vehicle for providing maintenance service for long-term capital equipment or fixtures beyond one-year increments to the public sector.

BRIEF DESCRIPTION OF THE DRAWINGS

The foregoing and additional features and characteristics of the present invention will become more apparent from the following detailed description considered with reference to the accompanying drawings in which like reference numerals designate like elements and wherein.

DESCRIPTION OF THE PREFERRED EMBODIMENTS

Figure 1:
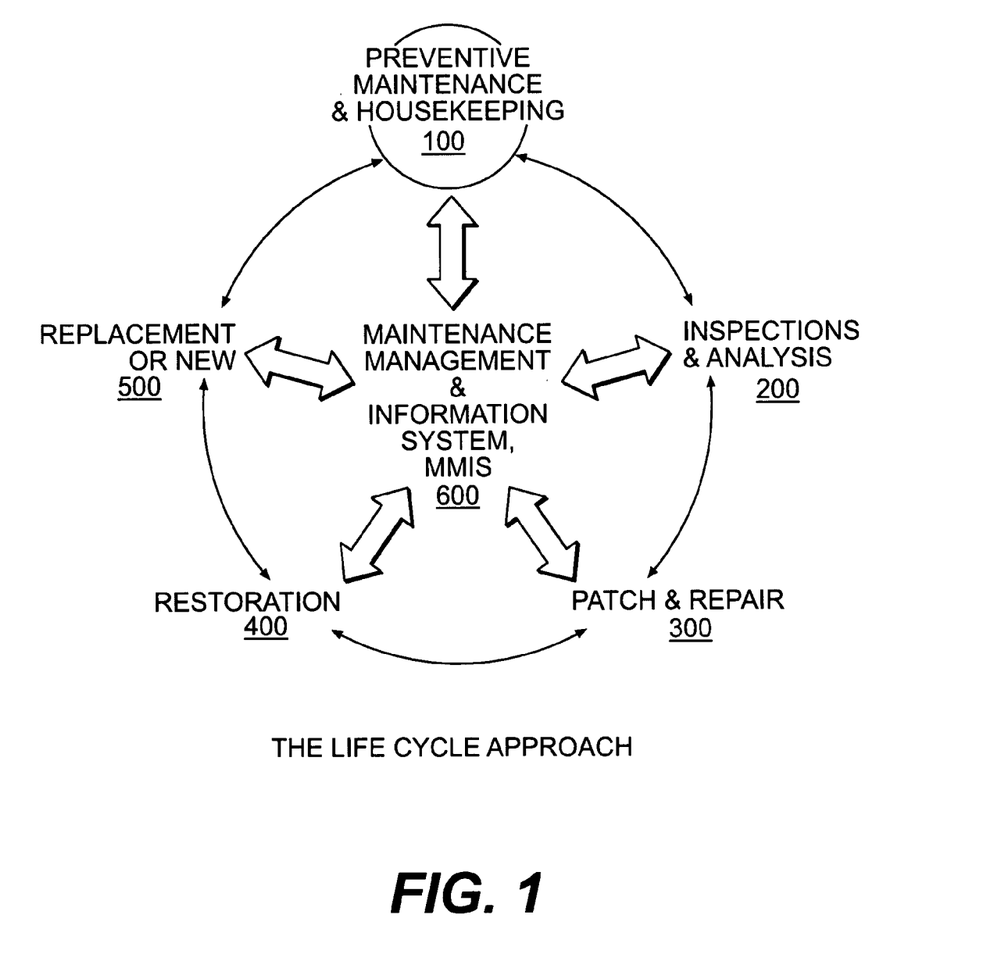
FIG. 1 is diagram illustrating the processing methodology—life cycle approach—of the present invention.

The method for providing maintenance service for long-term capital equipment or fixtures takes a life cycle approach as shown in FIG. 1 to serve the desire of owners and facility managers for long term performance for their capital equipment assets. The method may start with any one of the five elements, namely, prevent maintenance & housekeeping 100, inspection & analysis 200, patch & repair 300, restoration 400, replacement or new 500, then move clockwise or counter clockwise according to the need determined by a computer-implemented maintenance management information system ("MMIS") 600. In this example of roofing, the Roof Management & Information System ("RMIS") is used. By offering single source responsibility through the lifetime of the capital equipment, in this case a roof, the MMIS focuses on the right roofing and weatherproofing solution best fitting the owners' budget restraints, whether it be preventive maintenance 100, repair 300, or replacement 500, rather than resorting to short-term, piece-meal measures.

Figure 2A:
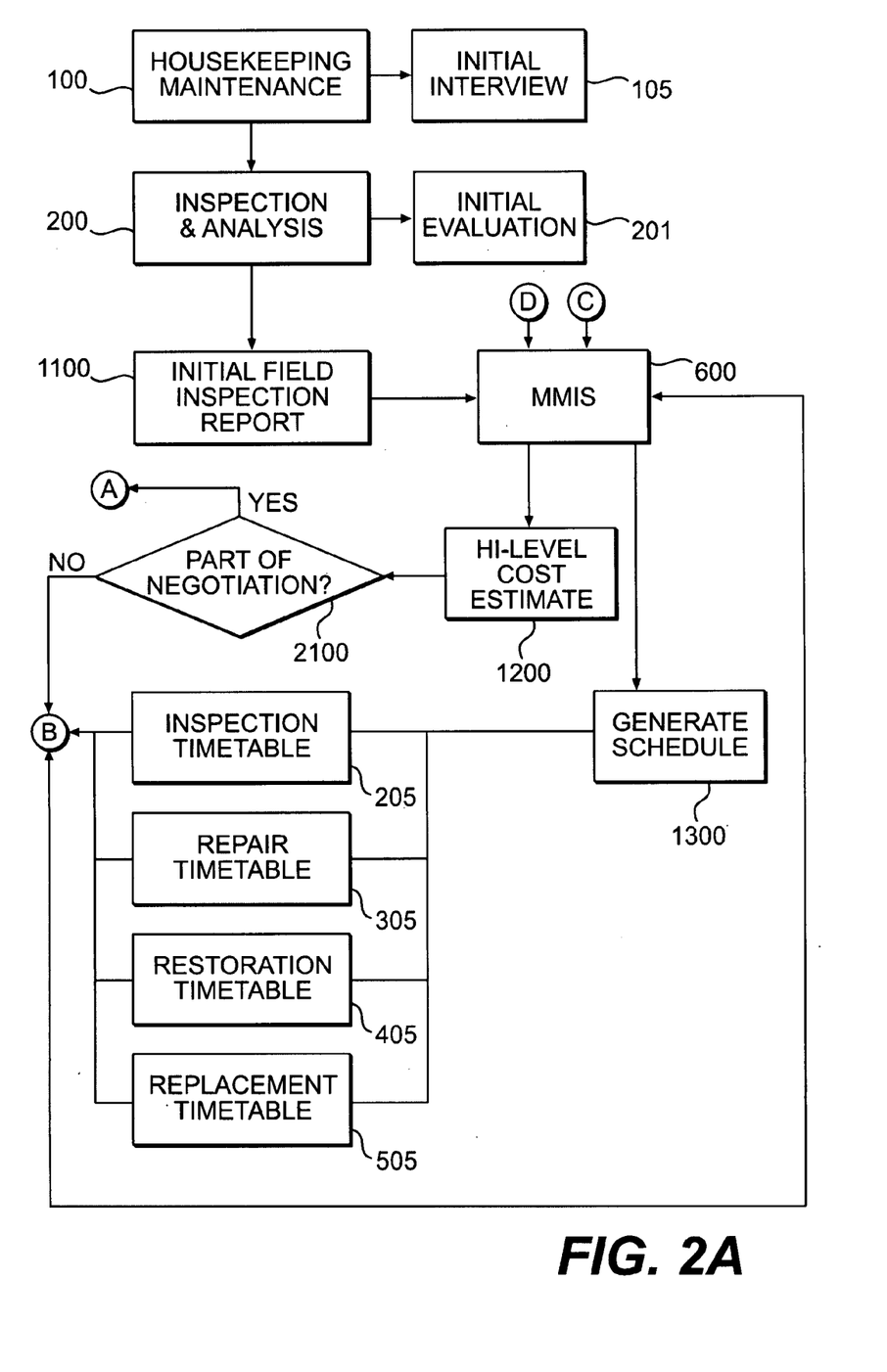
FIGS. 2A and 2B together are a flow chart illustrating the structure flow for one embodiment of the operation of the present invention.
Figure 2B:
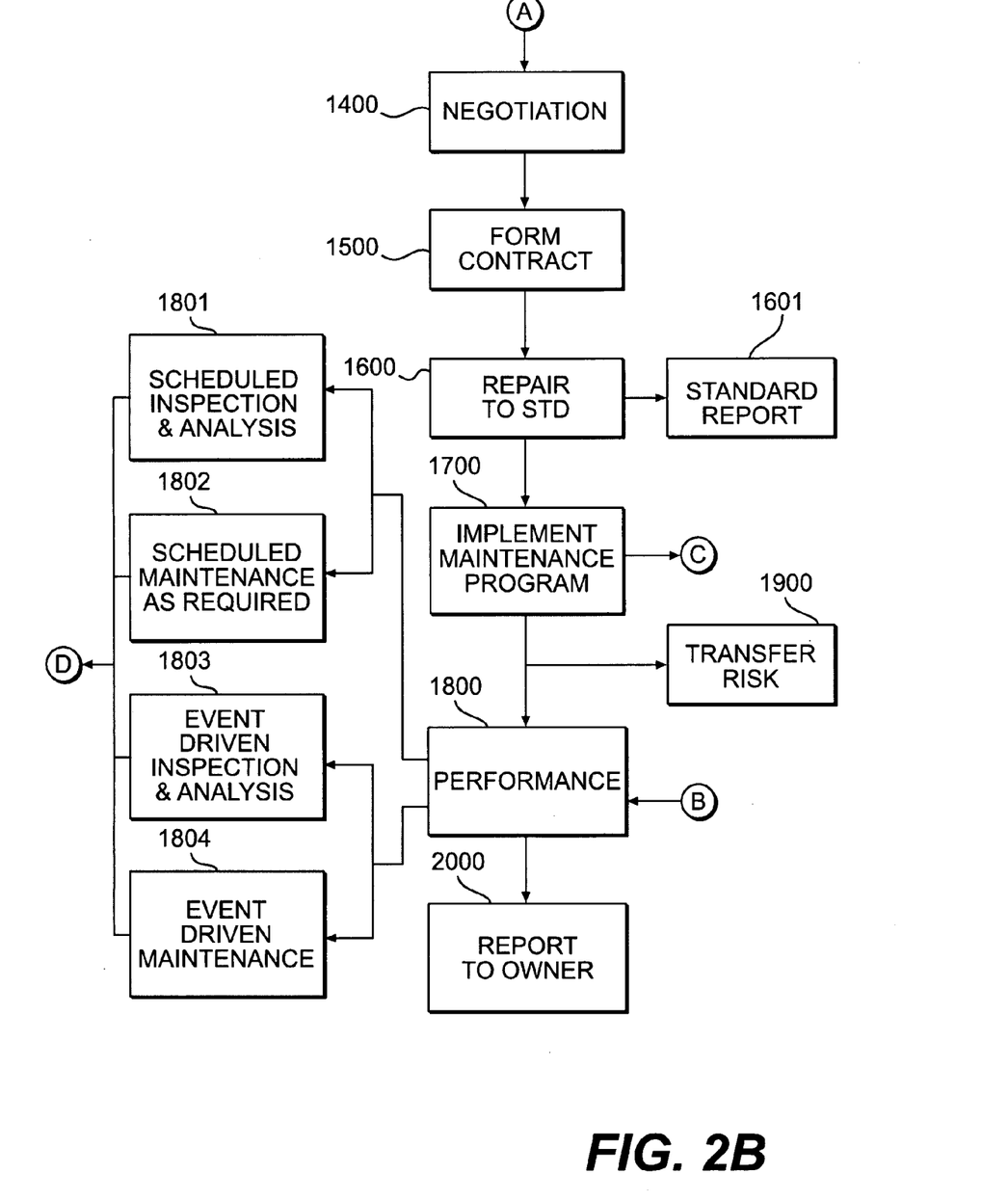

As an overview of the process starting from the step of preventive maintenance & housekeeping 100 and referring to FIGS. 2A and 2B, prior to doing any work, field advisors and technical service representatives 105 are sent to interview the owners or managers to collect the information on past roofing and weatherproofing experiences of building owners and facility managers, understanding current concerns and surveying the roof inventory to be recorded by the MMIS 600 which will determine the options for maximizing the roofing and building lifetime. The key is to provide full and single-source services from initial consultation to customized problem solving and covering all the roofing and weatherproofing needs via the life time of the roof.

The step of initial inspection and analysis 200 is performed in conjunction with the goals and budgetary considerations of the building owners and facility managers collected from the step 100. Within the step of initial inspection and analysis, a professional is sent to the facility to evaluate the physical condition of the roof and determine what work, if any, is needed to restore it to predetermined serviceable conditions 201. An initial field inspection report 1100 is then prepared that covers what the inspection has revealed. That field inspection report 1100 is then inputted into MMIS 600 that then generates the high-level cost estimate 1200. The high-level cost estimate 1200 includes recommendations for any necessary repairs along with detailed cost estimates for repairing 300, restoring 400 or replacing 500 to the predetermined serviceable conditions. The costs for conducting the initial inspection and analysis 200 and for generating the initial field inspection report 1100 may be included in the proposed contract or charged separately. As one of skill in the art would appreciate, such a report and cost estimate can have different applications in the industry, and thus has the potential of being generated for banks, mortgage agencies, or potential buyers of a property.

The high-level cost estimate 1200 is then used to negotiate the terms of the contract with the building owner or facilities manager 1400. These negotiations include determining the initial standard conditions to which the roof would be repaired, modified, improved or replaced and which would serve as the starting point for the maintenance to be performed. Once the terms of the contract are established, the contract is then formed and finalized 1500.

With the contract in place, repairs are initiated in accordance with the initial standard conditions 1600, as determined above. Depending on the prior condition of the roof, the recommendations made in the high-level cost estimate, and the desires of the building owner or facilities manager, these standardization repairs may be minor or very extensive. In any event, the condition of the roof to be maintained has to be brought at least to within industry acceptable parameters that can be maintained over the life of the contract.

Once the standardization repairs are completed, a report 1601 of the condition of the roof as repaired is generated, whereby the maintenance program can be initiated 1700. The initiation of the maintenance program 1700, in conjunction with the terms of the contract 1500, effects two primary elements of the system: (1) the actual performance of the maintenance program is started 1800; and (2) the warranty comes into effect transferring the risk of maintaining the roof from the building owner or facilities manager (the owner) to the party conducting the maintenance program and the warranty (provider) 1900. The performance 1800 includes by operation the inputting of the report 1601 into MMIS 600 which then generates a maintenance schedule 1300 which includes timetables for inspection 205, repair 305, restoration 405, replacement 505 and other maintenance services for the period of the warranty and a breakdown of costs for the relevant maintenance according to the maintenance schedule 1300. In addition, periodic reports to the owner 2000 may be generated by the MMIS 600. For example, reports may be sent (1) after each scheduled inspection and analysis, and scheduled maintenance activities; (2) after each event-driven scheduled inspection and analysis, and scheduled maintenance activities; and/or on a regular schedule depending on the desires of the owner (e.g., monthly, quarterly, yearly).

Periodic roof maintenance plays an important part in the life of a roof system. Such a routine inspection and maintenance program is crucial to extending the life of industrial machinery and other plant systems in a facility. Routine rooftop inspection can help maximize the roofing system investment by identifying minor problems before they become major problems needing repairs. When the maintenance schedule 1300 is properly executed, it will add years of service to the roof by detecting minor problems before they become major, as well as providing better protection for the building. Although best initiated when a roof is designed and installed, a preventive maintenance program, in most cases, can be implemented at any point of the life cycle in FIG. 1 to extend the service life of a roof. The intent of preventive maintenance is to enable building owners through their warranty providers to proactively identify and implement solutions to roof system problems before they become widespread. In many cases, if a problem is identified early and properly repaired, the extent and cost of repairs will be significantly less than if problems were left unattended.

The MMIS 600 is programmed to schedule maintenance inspections 205 at least annually, but preferably at least twice a year, ideally in the spring and fall. Spring is a good time to repair roof damage incurred as a result of winter weather. Late fall is also a good time to inspect so as to secure the roof and make any required repairs before winter. In addition, the MMIS 600 may be linked with real-time databases on conditions that may affect the condition of the roof. Such real-time databases include those reporting on real-time weather, local seismic conditions, pollution levels, etc. Even more, an operator may be able enter data into the MMIS 600 in order to report the occurrence of such unusual events into the system. This allows the MMIS 600 to schedule inspections after severe or abnormal weather conditions such as winter storms, periods of icing, hailstorms, or hurricanes, earthquakes, or other events or conditions. The MMIS 600 will also note on the list for inspection any weather conditions (wind, rain, ice, and snow) to warn the crew of any weather-related safety concerns.

A preventive-maintenance inspection 200, 205 typically consists of a thorough visual inspection of a roof system and its adjacent surfaces (e.g., walls), including the membrane, flashings, copings, gutter and downspouts, roof drains, walkways, expansion joints, vent pipes, skylights, ductwork, caulking joints, electrical conduits, and any mechanical equipment on the roof, as well as mechanical equipment that can impact the roof system's waterproof integrity. Conditions typically are recorded in writing and photographed, and the documentation should be maintained in a file. Such a file can be useful during future inspections because it can provide a basis for comparison of changing roof system conditions. During an inspection, it is recommended that any debris or other materials that do not specifically belong on the roof be removed.

The MMIS 600 generates an inspection checklist, which includes but is not limited to (for the roof system example) flashing, pitch pockets, caulk, support structures, fascia and roof edging materials, termination points. Other important steps of inspection include: making a preliminary assessment to identify any major, potential problems, finding and fixing vulnerable spots, examining areas around rooftop equipment, cleaning gutters and drains, keeping accurate, detailed records, reviewing the warranty and notifying the insurer, while minimizing rooftop traffic.

A field investigator conducting the inspection 200,205 examines the construction and condition of the roof system as well as its components, and then records that information in a customized PC-compatible management database. With this information, the MMIS 600 identifies areas that need attention, makes recommendations and prioritizes tasks based on available budgets. The MMIS 600 then generates a report and quotation as part of the cost estimate 1200. If the cost estimate 1200 is generated in conjunction with a contract negotiation, the cost estimate 1200 is presented in accordance with steps 1400 and 1500. Otherwise, if generated during the performance of the maintenance program 1800, the cost estimate is reported to the client.

The objective of the analysis is to provide accurate cost effective services for the highest "Return On Investment" (ROI). The actual cost of roofing is expressed according to the formula: (Material Cost)+ or −(Assessment Accuracy)× (Contractor Markup, Labor, Overhead, Scope of Work)= (Bid Cost)+(Quality Assurance Inspections)+(Preplanning Assessment, Design, Specifications) (Actual Cost of Roofing (ACR)).

Any restructuring of the service schedule 1300 changes the ACR. The MMIS 600 assesses any roof's condition and plan a course of action ("if", "when", "cost") to repair or replace that roof with accurate baseline information collected in steps 100, 200 or 205. Other commercial roof asset management programs merely provide fragmented practices or separating key functions, which ultimately result in an unacceptable level of performance and ultimately, an inaccurate/unacceptable "Return On Investment".

The scheduling of repairs 305, restorations 405 and replacements 505 are dependent on the data gathered by the maintenance inspections 205 which is inputted into the MMIS 600. The steps performed in accordance with each of those schedules would be, as one of skill in the art would understand, in accordance with the terms of the contract 1500, industry accepted standards for repair, restoration or replacement of a roof, or the specific requirements of the materials used in the roof being maintained.

For example, as a building ages, the abuse that the roof experiences from weather, movement, modifications and traffic may cause minor problems, that if not fixed, could become major problems. In the roof membrane and flashings, these could be blisters, splits, and tears; while walls and other surfaces may experience cracking and mortar deterioration. Although not severe enough to warrant a large project, they do threaten the system's integrity and need to be repaired promptly. If repairs 300 based on the schedule 305 are necessary, routine repairs sometimes can be carried out immediately. If repairs cannot easily be made at the time of inspection 200, 205, they should be implemented as soon as possible to avoid further roof system deterioration.

That same approach applies to restoration 400 or 405, and replacement 500 or 505. Restoration 400 or 405 is a cost-effective, proactive maintenance process designed to prolong the life of a functioning build-up, modified, singly ply or metal roof. The MMIS 600 determines from laboratory analysis data, for example, how to restore or upgrade the performance of the existing roof and its components by identifying and repairing defects in addition to providing a new top coat to restore waterproofing continuity. Replacement 500 or 505 is necessary when deterioration of the roof or deck is so extensive that it cannot be corrected by repair or restoration. Should the roof require replacement (or if the owner is planning to roof a new structure), the MMIS 600 can specify the most suitable roofing systems for the conditions that the roof is anticipated to experience.

Within the step of the performance of the maintenance schedule 1800, inspections and analysis scheduled by the MMIS 600 (see step 205) are conducted 1801 and reported back to the MMIS. In accordance with the data generated by the inspection 1801, regular maintenance and repair activities are conducted 1802 in order to attend to regular wear and tear matters. When those regular repairs and maintenance are completed, the details of those repairs are reported back to the MMIS 600.

In addition, in response to unusual events or conditions such as those discussed above, the MMIS 600 will schedule event-driven inspections and analysis 1803 (see step 205). Data gathered from those event-driven inspections and analysis are reported back to the MMIS 600 so as to schedule event-driven maintenance and repair activities 1804. As those activities are completed, data on the repairs are reported back to the MMIS 600.

All the information, including photos of the roof after each service visit, is recorded in an electronic file on the roof by the MMIS 600, including its maintenance history, to keep track of its condition with periodic updates as shown by the flow of information according to FIGS. 2A and 2B.

Figure 8:
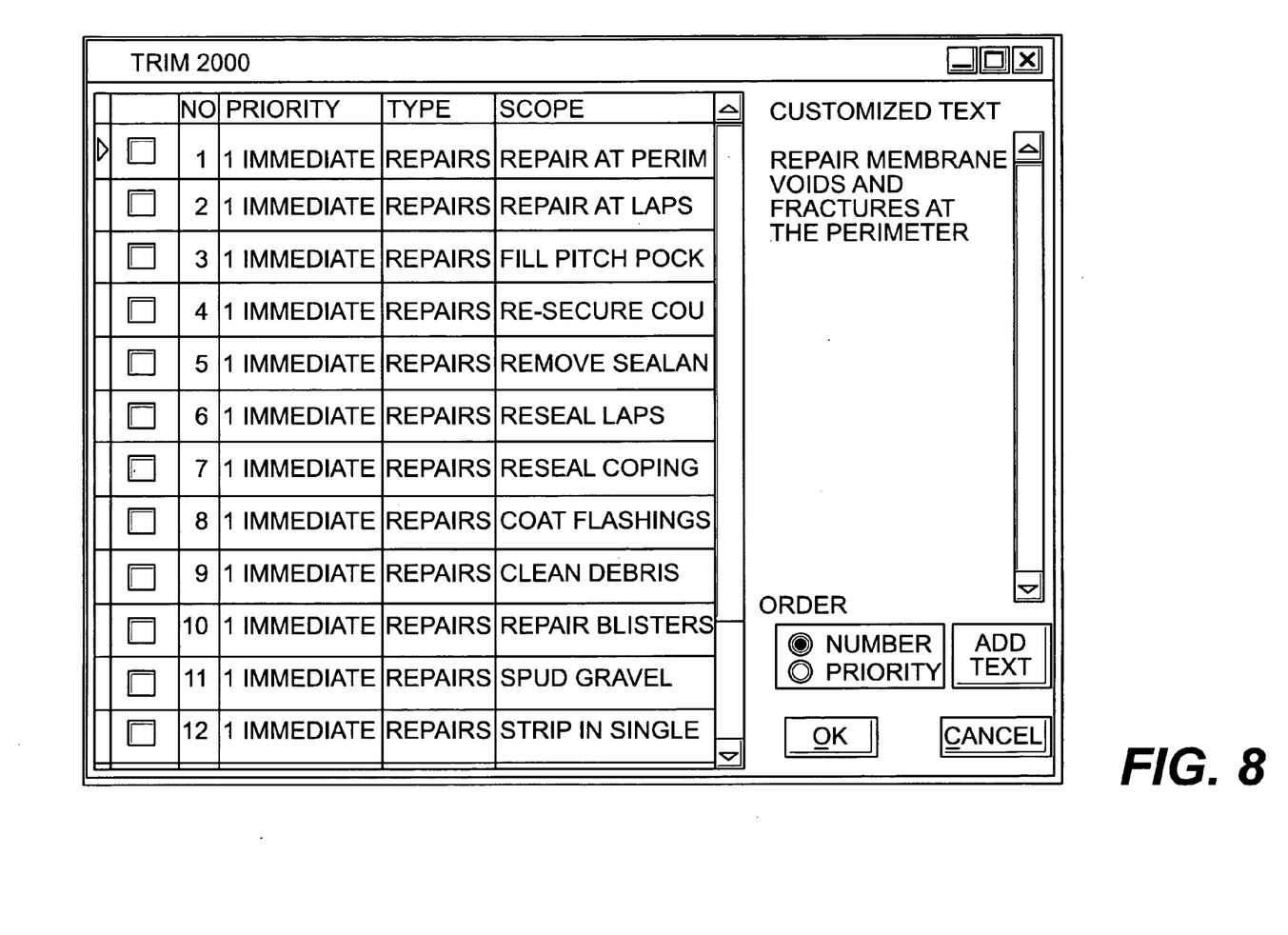
FIG. 8 shows a task priority screen provided by the Roof Management & Information System according to the present invention.

The MMIS 600 in at least one embodiment, using the RMIS as an example, is language-independent, and it supports cross-platform applications, such as Windows NT, Java, and Solaris platforms (XML, COM and CORBA), relational databases, such as but not limited to Informix, Oracle8 and SQL Server, or any spreadsheet modules. The data is easily exported into other financial spreadsheet programs so that the user can toggle between its budget and actual cost and create expense verses capital summary. Accordingly, the MMIS 600 allows the user to prioritize tasks based on available budget dollars (FIG. 8), manipulate financial data as the needs change, analyze the impact of inflation on the cost, or schedule work flow according to its exact specification.

Today's market is abundant with software programs purporting financial information relating to roofing costs. Unfortunately, a majority of these are based upon matrices and not condition specific indexes. Others, while potentially adequate, fall into a one size fits all category and are at the mercy of those providing field service information. Accurate "Return on Investment" information is basic: You need to insure that the provider you employ can insure "condition specific" field information, by seasoned personnel. This information should then provide: (1) true annualized ACR based on project restrictions for occupancy, codes, structural limitations, cost of money, etc.; (2) comparative analysis of repair versus re-roofs; (3) true regional/local unit price structure for repair and maintenance based upon the required repair materials, not generalities; and (4) transferable database translating into condition specific repair and re-roofing specifications. In another embodiment, the MMIS 600 may be designed to itemize the scope of work before proceeding so as to help the owners or managers to make an informed decision, especially during contract negotiation.

Figure 3:
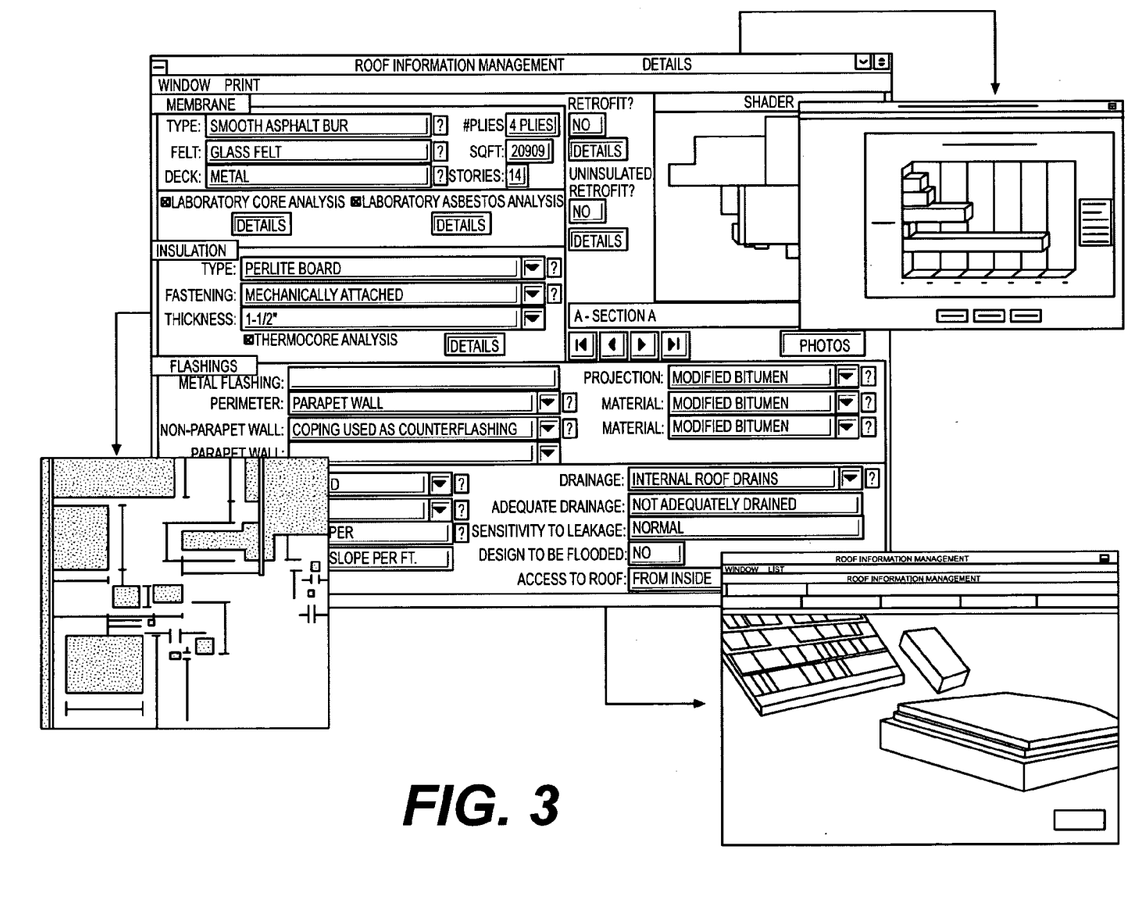
FIG. 3 shows a details screen provided by the Roof Management & Information System according to the present invention.
Figure 4:
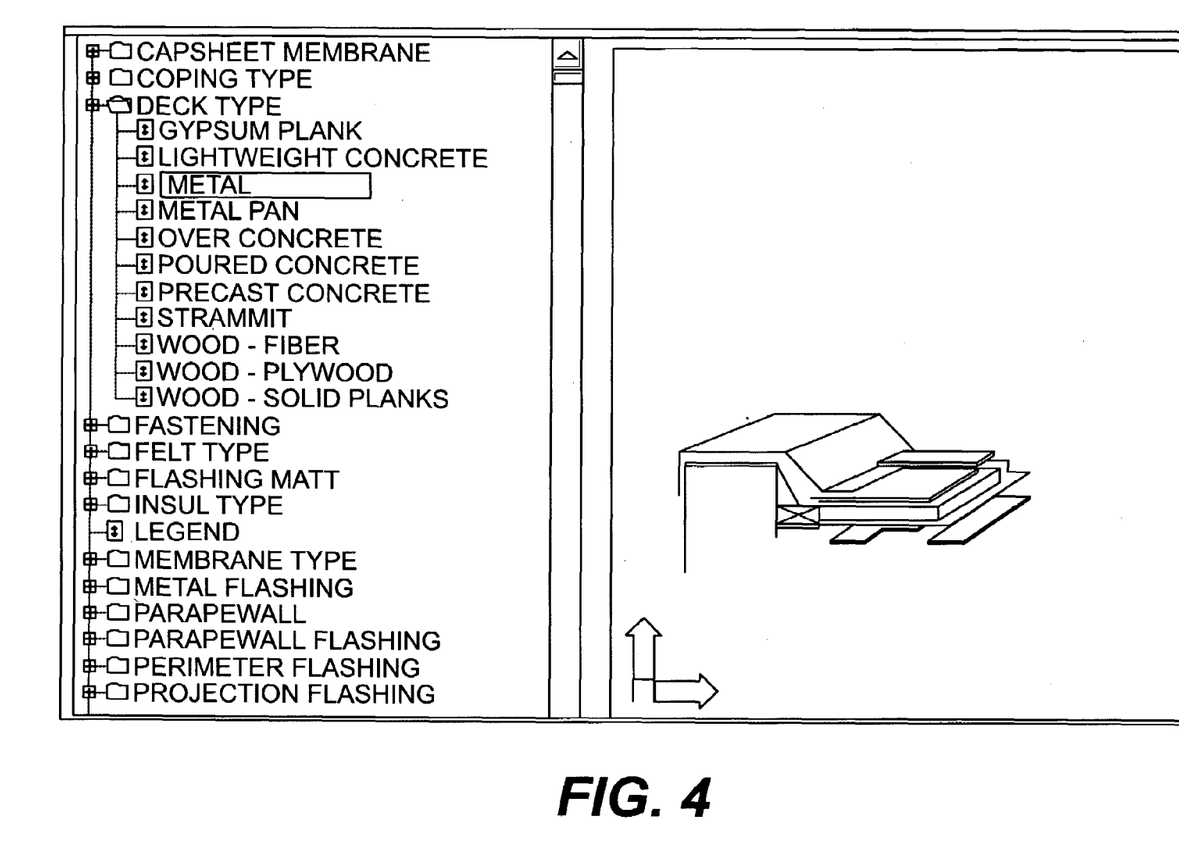
FIG. 4 shows a glossary diagram screen provided by the Roof Management & Information System according to the present invention.
Figure 5:
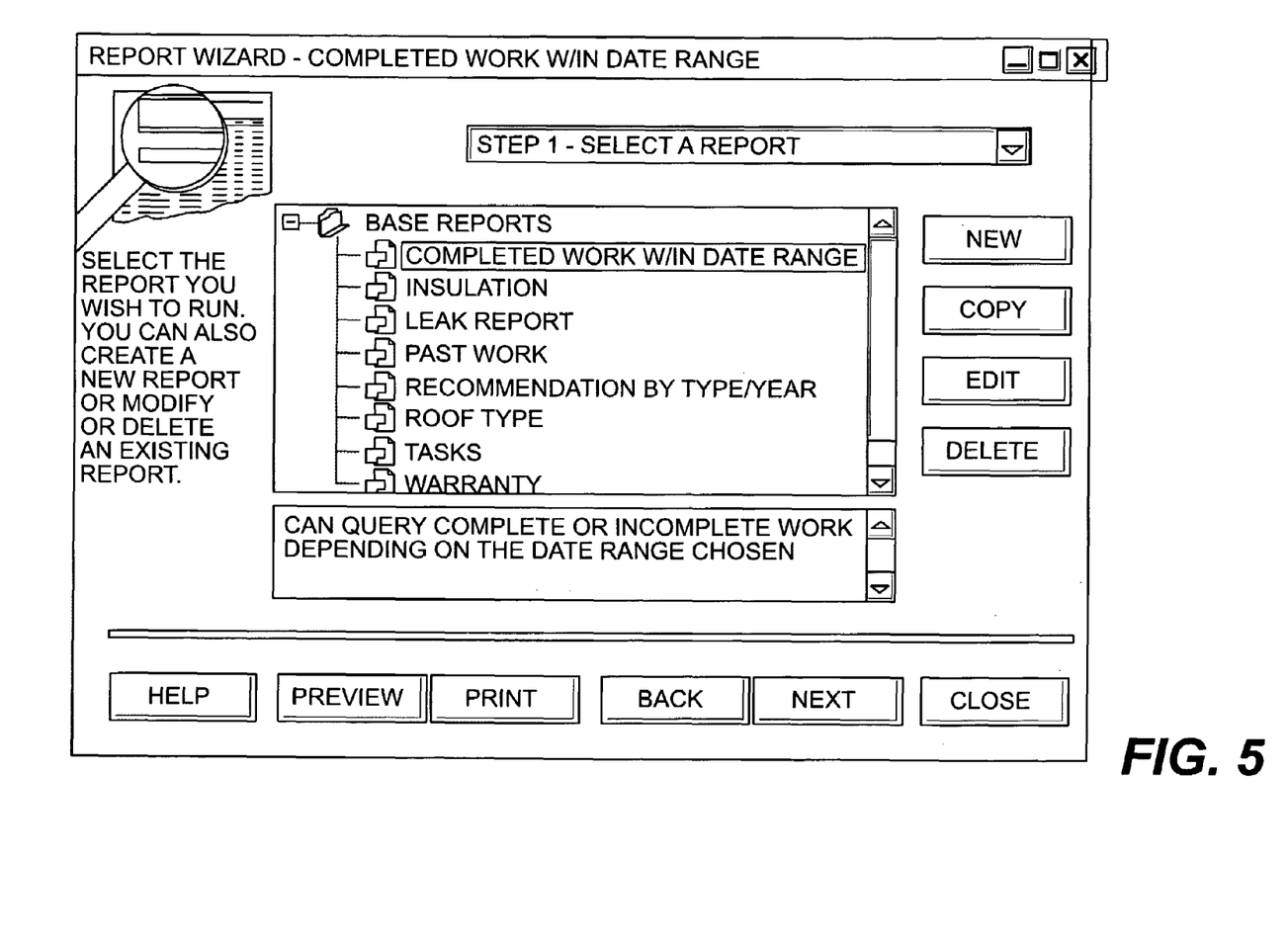
FIG. 5 shows a reports screen provided by the Roof Management & Information System according to the present invention.
Figure 6:
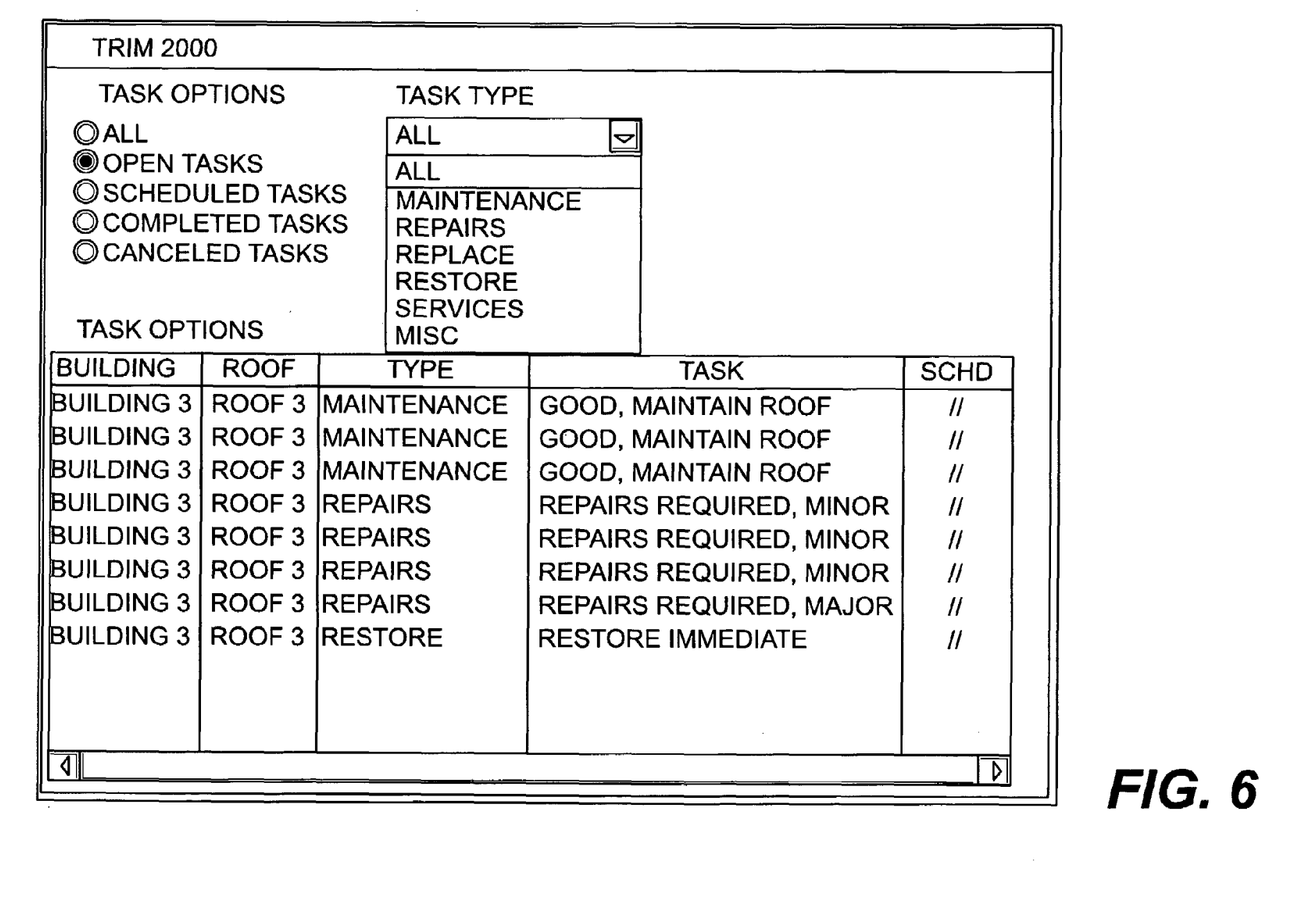
FIG. 6 shows a task screen provided by the Roof Management & Information System according to the present invention.
Figure 7:
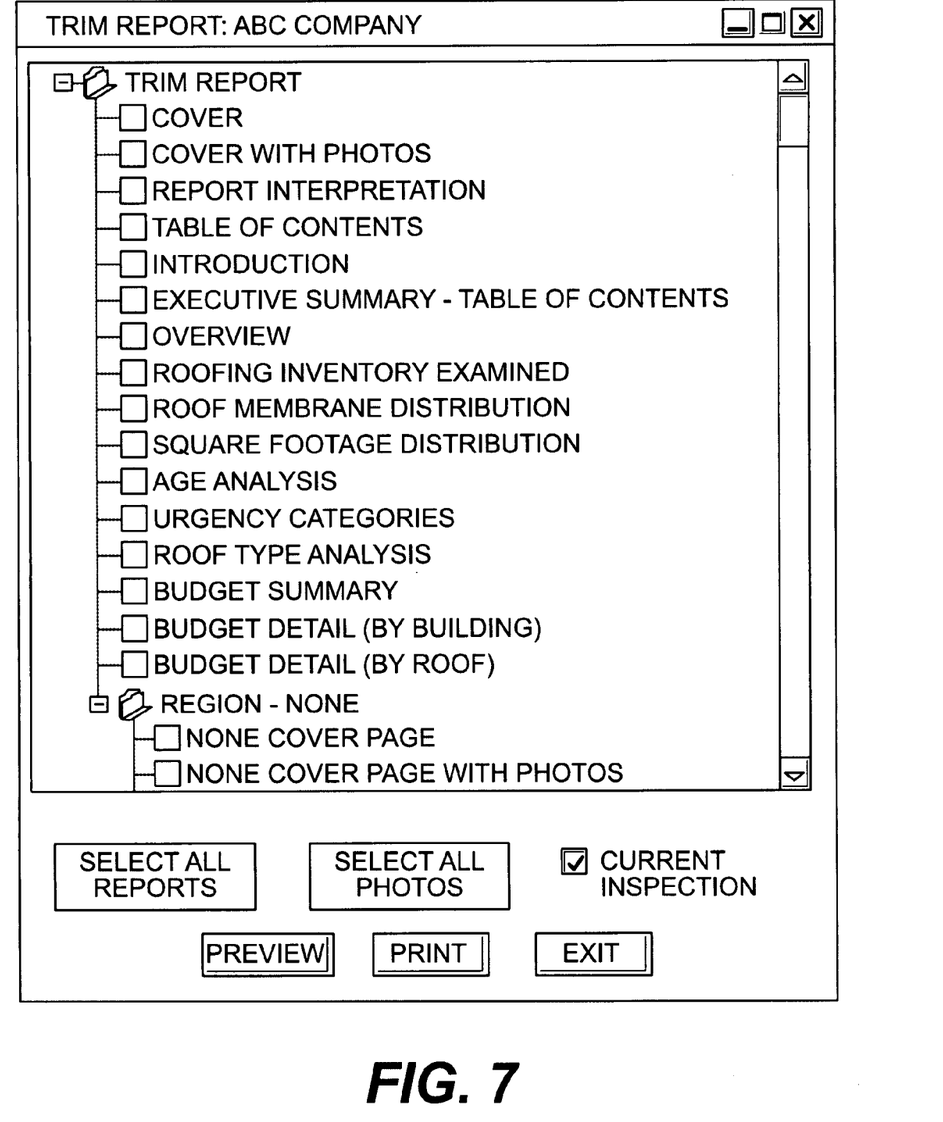
FIG. 7 shows a customizing report screen provided by the Roof Management & Information System according to the present invention.

The interface of the MMIS 600, using as an example the RMIS system, provides the details screen as shown in FIG. 3 which includes the detailed information of different portions of a roof. Via the details screen, a user can access CAD drawings or digital photos of the roof, glossary diagrams (FIG. 4), thermal infrared analyses, data of humidity and asbestos tests (patent numbers to be incorporated by reference), or the scanned warranty. A variety of reports (FIG. 5) can be generated by the MMIS 600 with summary by total, region, facility or task (FIG. 6) or selected portions (FIG. 7) and presented by bar, pie or other charts.

An additional benefit of establishing an ongoing preventive-maintenance program according to the present invention is that it allows for a planned, organized approach to management of a roof asset, as well as for responsible, timely preparation of long-term capital expenditures. Up to 80% of roof leaks occur from cracked or separated flashing due to age or movement of the roof. The preventive maintenance work includes units, exhaust, vents, plumbing stacks, power line boxes, drains, skylights and perimeter. In order to keep a roof from premature aging, a protective layer of coating is applied depending on the type of roof so as to seal all cracks and crevices. Reconditioning the roof and extending the life also gives a reflective finish to help lower cooling cost. Preventive maintenance work is included with the warranty 1400, which is bundled with the initial contract for conducting the initial repair 300, restoration 400 or replacement or installation a new roof 500.

Failure to comply with the requirements of the contract, such as allowing the routine inspections, by the owners or managers may invalidate the warranty 1400, especially if a condition not covered by the warranty is later determined to be the principal cause of roof failure. In some cases, visual inspections and surface repairs may not be enough; and a more comprehensive analysis of the roof may be required in order to fully evaluate its condition. Laboratory tests of core samples can be done to determine the internal condition of the roof, while non-destructive moisture analysis can identify and measure the amount of moisture hidden within the roof.

The method of the present invention provides a warranty to owners, facility managers, contractors, and all other roofing professionals. The warranty is totally different from the two traditional categories of roofing or other capital equipment warranties: a contractor's warranty covers workmanship, and a manufacturer's warranty covers materials. In the system of the present invention, all repairs include a limited guarantee on work performed. All the services are carried out through quality assurance with each product and by trained, qualified professional staff. All material manufacturers carry product liability insurance and publish varying degrees of disclaimers by design. All contractors, all consultants, material manufacturers and roofing contractors carry liability insurance prior to making critical recommendations or choices. All the services are carried out through quality assurance with each product and trained qualified professionals. All work is guaranteed, under private or public liability insurance to offer stability and security for the roofing. The present invention combines the above elements and goes one step further by transferring the risk of maintaining the capital equipment from the owner to the warranty provider.

The contract generated under step 1500 may include a host of roof maintenance services including but not limited to: a 24 hour leak hotline and routine preventive maintenance, training the owners' or the managers' maintenance personnel to perform basic problem identification and roof repairs, turnkey services to reduce owners' participation, etc. For example, the system of the present invention can include providing seminars that cover important topics such as the cost of quality, flashing details and design, the significance of good roof design, how to select the warranty, and other good roofing practices.

The genesis of the invention are (1) managing all maintenance service via a life cycle approach; (2) and integrating all information under one software; and (3) transferring all maintenance risk to the service provider via the warranty.

In contrast, the traditional provider of the service is only responsible for meeting the service requirements as defined by the agreed scope of work. Under such a scheme, the service providers always limit their risk through negotiated terms and conditions of the scope of work. The work, such as Patch and Repair and roof restoration, is bundled into customer proposals and broken into the various components and costs. Even with bundling, roof performance risk remains largely on the customer.

The warranty also resolves the problem of limits imposed by public financing laws by bundling the warranty with an initial service contract. Current year public funds may be used to purchase a multiyear warranty consistent with industry standards. The warranty transfers performance risk through the use of performance work statements and outcome measurements in the initial service contact, namely, "what" is expected as an outcome rather than "how" the work is to be accomplished. The warranty acts as an umbrella for total roof performance. To that end, services ranging from simple patch and repair through total roof replacement may be necessary and cosseted into the price of the warranty.

In other words, the warranty essentially privatizes the performance of the roof or component covered by the warranty and allows the owners to lock in the cost of maintenance. The warranty addresses the concerns within the public and private sectors. The warranty assumes liability for the facility component covered with standard exclusions such as unauthorized (coordinated) changes or abuse to the structure and acts of God. The warranty may be issued/sold for up to 20 years, consistent with industry standards for roof warranties. The warranty allows the owners or managers to focus on their core business activities rather then the facility maintenance.

The system of the invention can be applied to all kinds of commercial or residential premises, including at least with respect to the roof maintenance example. The application of the present invention extends to not only roof repair and maintenance, but also any long-term capital investment fixtures that require long-term maintenance and repair. This includes HVAC systems, roads, underground sewer systems, etc. In addition, the local weather conditions and building codes are incorporated into the predetermined start-up standard. One of skill in the art, given the disclosure of the present invention, would understand how each of the components of the system would be applied to the capital investment fixtures.

The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A method for a third party provider to guarantee the performance of long-term capital equipment or fixtures of an owner by managing and maintaining all components of the long-term capital equipment or fixtures for a specified period of time so as to allow the owner to better plan and prioritize limited budget resources, comprising the steps of:
   (1) diagnosing existing conditions of the long-term capital equipment or fixtures by the provider to determine if any repairs are required to bring the long-term capital equipment or fixtures to a predetermined start-up standard of performance, said predetermined start-up standard of performance being negotiated between the owner and the provider;
   (2) repairing the long-term capital equipment or fixtures by the provider to reach the start-up standard if any of the existing conditions are below the predetermined start-up standard;
   (3) developing a maintenance schedule by the provider to perform recurrent inspections, preventive maintenance, and housekeeping on the long-term capital equipment or fixtures so as to maintain the long-term capital equipment or fixtures at a standard of performance for a specified period of time, said standard of performance being negotiated between the owner and the provider and set to within industry acceptable parameters; and
   (4) providing a warranty by the provider on the long-term capital equipment or fixtures in conjunction with the purchase by the owner of performance of the (1)–(3) steps, said providing of the warranty including transferring from the owner to the provider the technical and financial risk including costs associated with managing and maintaining all components of the long-term capital equipment or fixtures within the standard of performance during the specified period of time.

2. The method according to claim 1, wherein the diagnosing step further comprising a step of inspecting at least one site where the long-term capital equipment or fixtures are located.

3. The method according to claim 1, wherein the diagnosing step further comprising a step of interviewing at least one owner or manager of the long-term capital equipment or fixtures.

4. The method according to claim 1, further comprising a step of generating a report on results of the diagnosing step.

5. The method according to claim 1, further comprising a step of inputting and analyzing results of the diagnosing step.

6. The method according to claim 5, further comprising a step of providing recommendations for any necessary repairs and cost estimates.

7. The method according to claim 1, wherein the maintaining step further comprising a step of inspecting the long-term capital equipment or fixtures according to the maintenance schedule so as to adjust the maintenance schedule.

8. The method according to claim 7, wherein the maintaining step further comprises a step of inputting results of the inspection step executed according to the maintenance schedule.

9. A computer-implemented method according to claim 1, wherein the step of transferring the risk includes transferring 100% of the risk from the owner to the provider.

10. A computer-implemented method according to claim 1, wherein the step of transferring the risk includes transferring 100% of the risk, except for unauthorized changes, abuse to the structure and acts of God from the owner to the provider.

* * * * *